United States Patent
Gamble

(10) Patent No.: US 6,267,450 B1
(45) Date of Patent: Jul. 31, 2001

(54) LOAD BALANCING SYSTEM

(76) Inventor: Christopher L. Gamble, P.O. Box 9154, Canoga Park, CA (US) 91309

( * ) Notice: Subject to any disclaimer, the term of this patent is extended or adjusted under 35 U.S.C. 154(b) by 0 days.

(21) Appl. No.: 09/342,886

(22) Filed: Jun. 29, 1999

Related U.S. Application Data

(60) Provisional application No. 60/091,839, filed on Jul. 6, 1998.

(51) Int. Cl.$^7$ ............................................. B60B 1/00
(52) U.S. Cl. ............................................. 301/5.22
(58) Field of Search .................... 301/5.21, 5.22, 301/63.1; 74/573 R, 573 F; 152/DIG. 20

(56) References Cited

U.S. PATENT DOCUMENTS

| | | | | |
|---|---|---|---|---|
| 1,314,005 | * | 8/1919 | Louden | 74/573 R |
| 2,687,918 | * | 8/1954 | Bell et al. | 301/5.22 |
| 2,771,240 | * | 11/1956 | Gurin | 301/5.22 |
| 3,109,321 | * | 11/1963 | Rogers | 74/573 R |
| 3,164,413 | * | 1/1965 | Salathiel | 301/5.22 |
| 3,166,356 | * | 1/1965 | Sutherland et al. | 301/5.22 |
| 3,191,997 | * | 6/1965 | Colvert | 301/5.22 |
| 3,314,726 | * | 4/1967 | Rehnborg et al. | 301/5.22 |
| 3,316,021 | * | 4/1967 | Salathiel | 301/5.22 |
| 3,346,303 | * | 10/1967 | Wesley | 301/5.22 |
| 3,376,074 | * | 4/1968 | Whitlock | 301/5.22 |
| 3,408,111 | * | 10/1968 | Foote | 301/5.22 |
| 3,724,904 | * | 4/1973 | Nixon et al. | 301/5.22 |
| 3,799,619 | * | 3/1974 | LaBarber | 301/5.22 |
| 3,897,977 | * | 8/1975 | De Meurisse | 301/5.22 |
| 3,913,980 | * | 10/1975 | Cobb, Jr. | 74/573 F |
| 3,953,074 | * | 4/1976 | Cox | 74/573 R |
| 5,048,367 | * | 9/1991 | Knowles | 74/573 F |
| 5,253,928 | * | 10/1993 | Patti | 301/5.22 |
| 6,070,632 | * | 6/2000 | Huinink et al. | 152/DIG. 20 |

* cited by examiner

*Primary Examiner*—S. Joseph Morano
*Assistant Examiner*—Long Bao Nguyen

(57) ABSTRACT

A load balancing system for rotating members such as vehicle wheels and engine flywheels. An annular groove or recess in the wheel or flywheel receives a length of flexible tubing joined to form a continuous annular ring. The ends of the tube are secured by a sleeve. The tube is partially filled with a balancing fluid mass such as a mercury or small metal balls in a viscous fluid such as silicon. To protect the tube, a sealant is injected into the groove or recess.

11 Claims, 5 Drawing Sheets

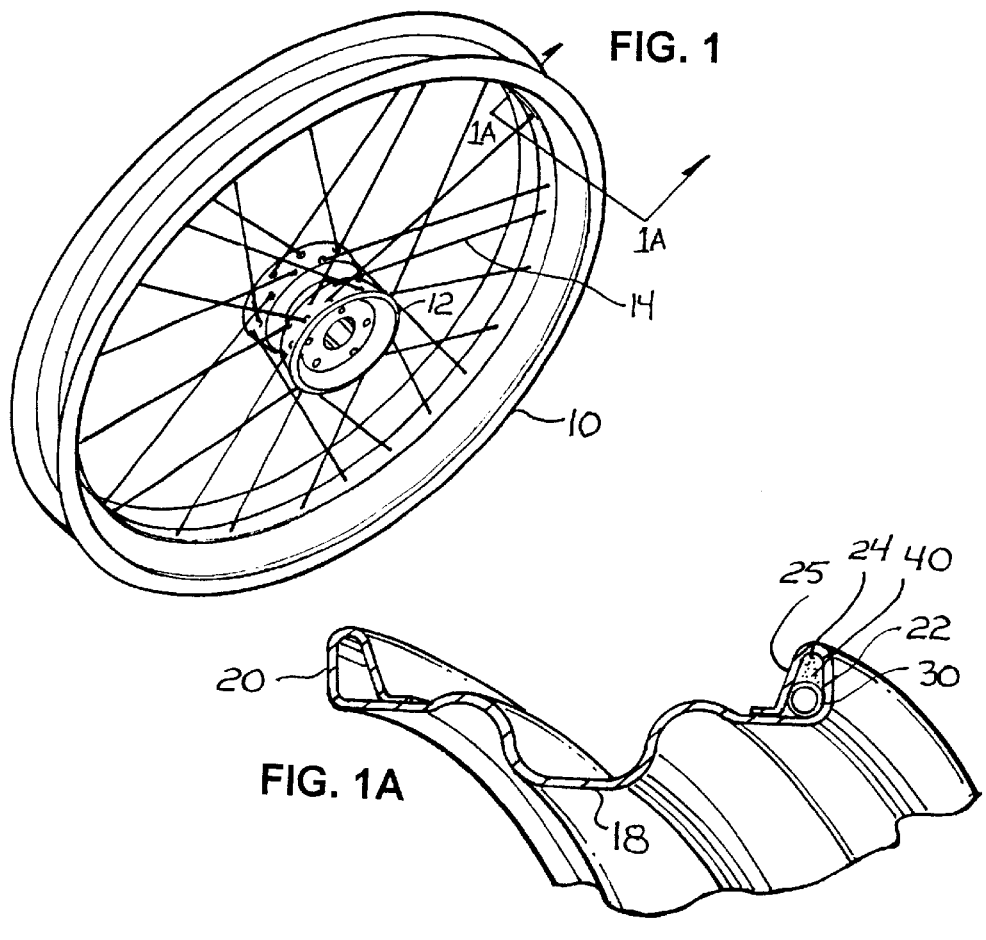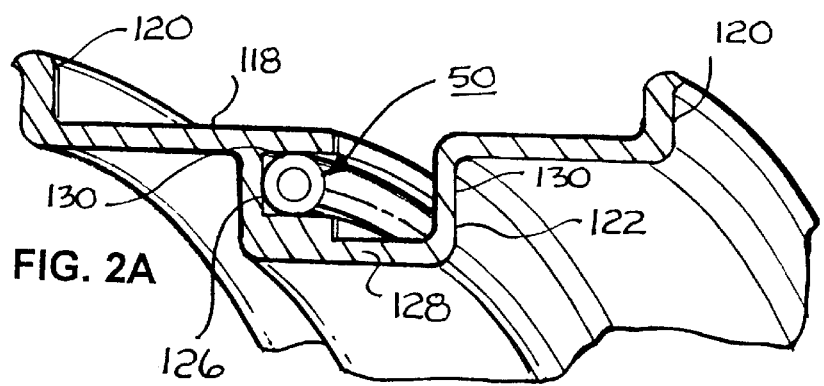

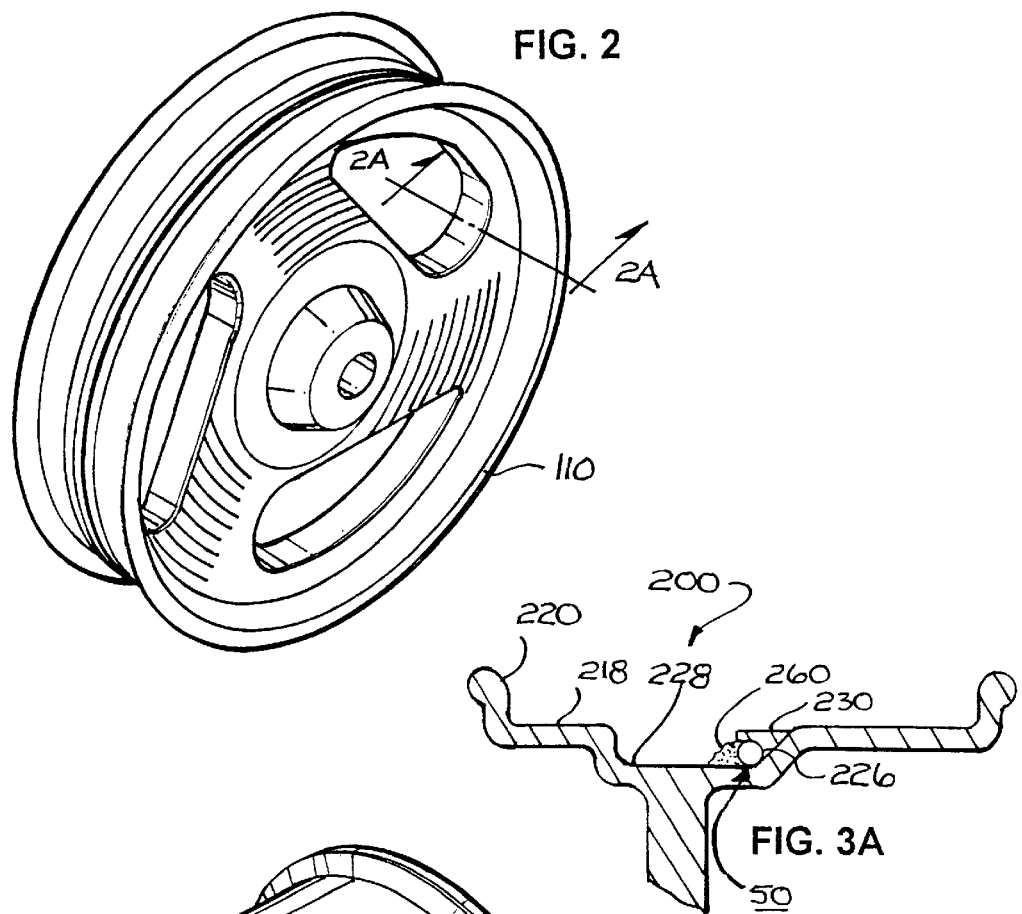
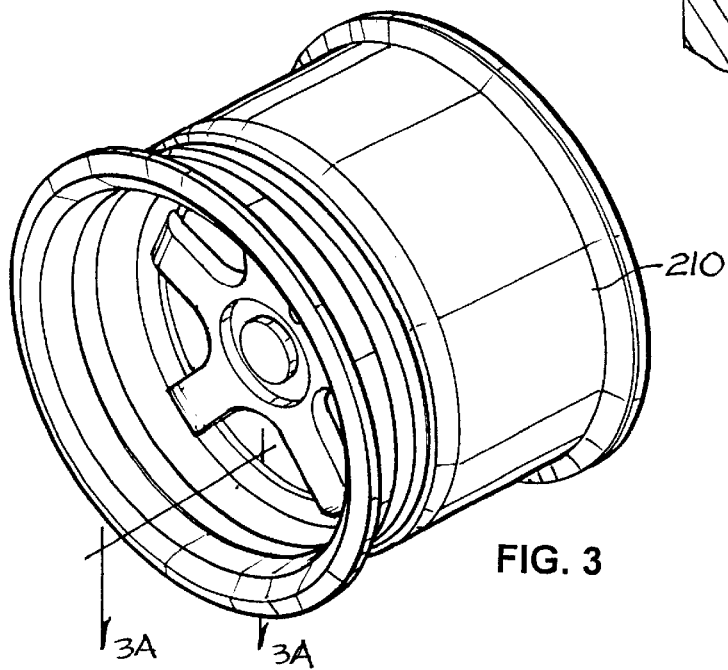

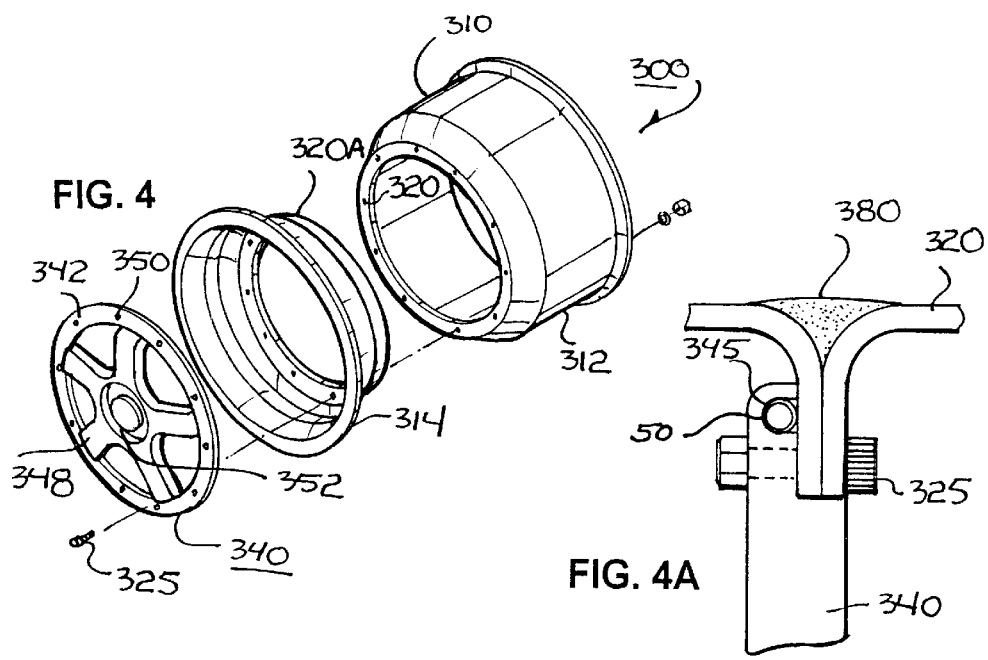
FIG. 4
FIG. 4A
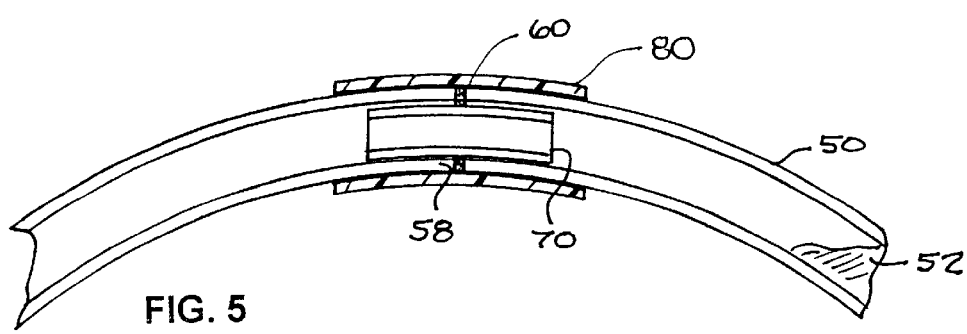
FIG. 5

FIG. 8
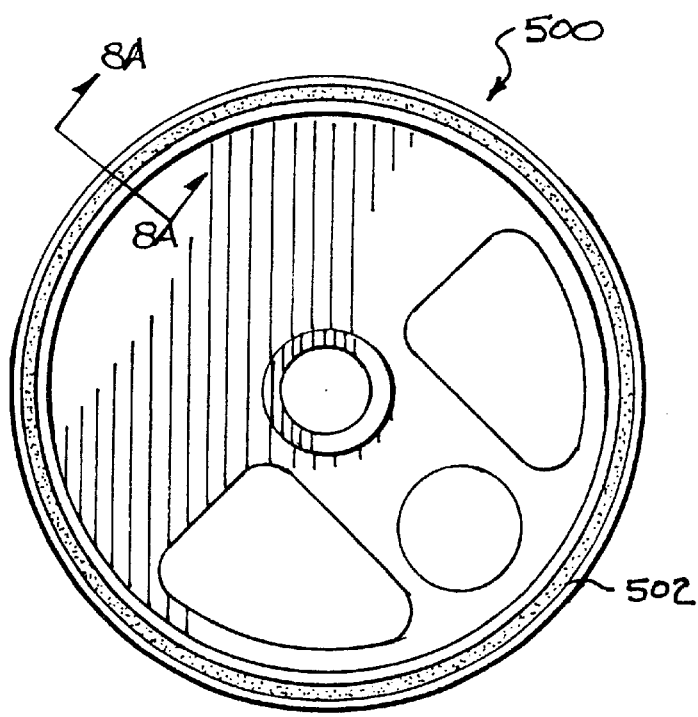
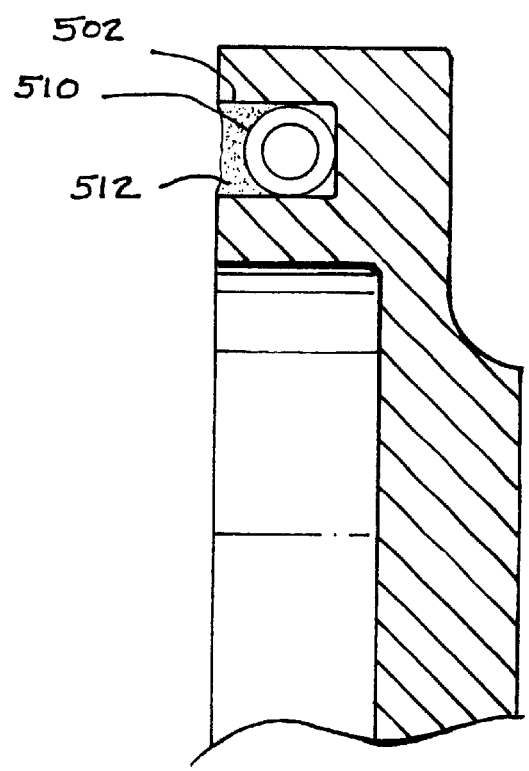
FIG. 8A

LOAD BALANCING SYSTEM

CROSS REFERENCE TO RELATED APPLICATION

This application is based on provisional patent application Serial No. 60/091,839, filed Jul. 6, 1998 entitled "Load Balancing System".

BACKGROUND OF THE INVENTION

Field of the Invention

The present invention relates to a load balancer for rotating members and more particularly relates to a balancing system for rotating members such as vehicle wheels and flywheels in which a movable fluid mass is disposed within a conduit which is secured to the rotating member within an annular recess or groove. The fluid mass shifts as the member rotates to compensate for imbalance and vibration.

Various systems have been developed for properly balancing rotating members such as wheel and tire assemblies so that the tire does not wear unevenly shortening the tread life of the tire. One of the most commonly employed systems for balancing wheel and tire assemblies secures counterbalancing lead weights to the wheel at various positions. Such a system is not entirely satisfactory since the weights are fixed and tend to compensate only for the condition that exists at the time of mounting. In the event the condition changes due to tire wear, balancing systems of this type are no longer effective.

U.S. Pat. No. 5,259,269 discloses a flywheel assembly having a hub and a web. Weights are secured to the flywheel in a manner so that the effective weight and position are adjustable to discrete positions correlated to different points of balance.

U.S. Pat. No. 4,755,006 discloses a dynamic wheel balancing device having flexibly weighting members which are driven outwardly by increased centrifugal forces to produce the desired balancing effect.

One particularly effective load balancing device is shown in my prior patent, U.S. Pat. No. 4,388,841. This patent discloses a load balancing device for rotating apparatus such as washing machines and vehicle tires. The device consists of a conduit defining an interior passage or raceway which contains a high density fluid mass which shifts or moves to oppose load imbalances. Mounting brackets are provided to attach the balancing ring to the structure. The attachment brackets are slidable along the ring and adjustable and adapted for securement in various positions or arrangements. In other embodiments, the attachment brackets are adapted to accommodate various wheel and bolt spacings for vehicles.

Later patents such as U.S. Pat. No. 4,870,908 have utilized load balancing systems similar to that shown in my '841 patent utilizing a tubular load ring containing a fluid and spherical load ballast member.

The load balancing system of my prior patent has worked well and has been commercially accepted. However, as indicated above, my prior device is one which has a mounting bracket which has a bracket or plate which is securable to the rotating member at a spoke or rim. Other prior art balancing arrangements such as those described are complex and may require manual adjustment and are not self balancing in operation. However, there are applications in which the universal bracket arrangement will not be accommodated easily on the rotating member. Further, there are applications where it is desirable to enclose a self-balancing member to provide maximum protection against damage to the annular balancing member.

SUMMARY OF THE INVENTION

Briefly, according to the present invention, an annular groove or passageway is provided in the rotating member. The rotating member may be a wheel component such as the rim of an automobile, bicycle or truck wheel or may be a flywheel or clutch component. The groove may be formed integrally with the rim as a rolled edge forming a flange which defines an annular groove or passageway. Alternatively, the groove may be formed by machining such as machining a groove into a flywheel surface. A section of flexible tubing containing a balancing fluid mass is inserted in the groove. The ends of the flexible tubing are joined to form a continuous annular tubing ring section by securing the ends by adhesive and preferably providing an exterior seal such as applying a shrink sleeve which is heated and will then form a tight seal at the butt joint. Preferably, once in place, balancing ring is protected by applying a suitable material such as a sealant such as a two-part epoxy within the groove covering or partially covering the balancing ring. The epoxy or similar material will resist heat and temperature change and will protect the ring against wear, abrasion and puncture.

BRIEF DESCRIPTION OF THE DRAWINGS

The above and other objects and advantages of the present invention will be more fully understood from the following description and drawings in which:

FIG. 1 is a perspective view of a wheel, such as a bicycle wheel, to which the balancer of the present invention has been applied;

FIG. 1A is a cross-sectional view of the rim of the cycle wheel shown in FIG. 1;

FIG. 2 is a perspective view of a typical rim for a vehicle tire such as a motorcycle or car rim to which balancer of the present invention has been applied;

FIG. 2A is a cross-sectional view of the rim shown in FIG. 2;

FIG. 3 is a perspective view of yet another form of rim for a vehicle tire such as a motorcycle, car or truck rim to which the balancer has been applied;

FIG. 3A is a cross-sectional view of the rim shown in FIG. 3;

FIG. 4 is an exploded, perspective view of another vehicle rim with the balancer of the present invention applied thereto;

FIG. 4A is a cross-sectional view showing the balancer applied to the rim of FIG. 4;

FIG. 5 is a detail view showing the manner in which the ends of the tube form the balancing ring are connected;

FIG. 8 shows a flywheel such as a flywheel for a motorcycle with a balancing ring secured therein; and FIG. 8A is a cross-sectional view taken along line 8A—8A of FIG. 8.

DETAILED DESCRIPTION OF THE DRAWINGS

Figure 6:
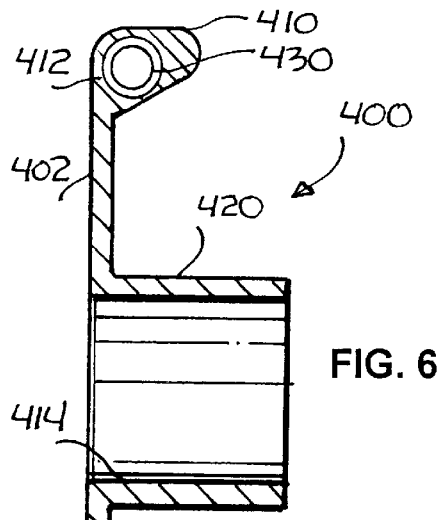
FIGS. 6, 7 and 7A show another application for the balancer as applied to a drive shaft.

Initially, a brief understanding of dynamic balancing is helpful. Because of variations in material density, manufacturing and machining tolerances, assemblies such as wheels and flywheels will exhibit slight variations from member to member. Add to this the fact that the centrifugal force generated by a rotating mass increases exponentially in relation to its speed, a slight imbalance can cause tremendous vibration at higher RPM's. Thus, with objects such as vehicle wheels, imbalance induced vibrations will cause uncomfortable and unsafe ride conditions and will impose excessive wear on parts and joints. Thus, it is important to achieve balanced load conditions.

Turning now to the drawings, FIG. 1 shows a representative wheel rim 10 which is shown as a motorcycle or bicycle rim having a hub 12 and radially extending spokes 14 which support a circumferentially extending rim 10. As seen in FIG. 1A, rim 10 has a centrally positioned bottom wall 18 and opposite side walls 20, 22. The tire and, in some cases a tube, are seated against these rim surfaces when inflated. In accordance with the present invention, the rim is formed as a rolled member having interior wall 25 so that a circumferentially extending channel or passageway 24 extends about the rim. The balancing member 30 is disposed within the protected channel area 25.

The balancing member 30, as best seen in FIG. 5, comprises an annular flexible tubular member 50 typically having exterior diameter of about ¼" to ¾" and an interior diameter of about ⅛" to ⅝". The tube may be any suitable material such as rubber or neoprene. Contained within the hollow interior of the tube is a fluid balancing mass 52 such as mercury or small metallic balls suspended in a viscous fluid such as silicon fluid, or the like. The opposite ends 58, 60 of the tube 50 are abutted as shown in FIG. 5 and joined by an adhesive 60. A short section of rigid or semi-rigid tubing 70 extends into the ends 58, 60 of the tubing 50. Tubing 70 may be PVC or similar material. Preferably, the joint is reinforced by the application of a shrink sleeve 80 placed about the joint which is heated after application to tightly compress about the joint. The shrink sleeve may be of the type used in connection with electrical cables and known to those skilled in the art.

Further, in order to protect and cushion the balancing member against environmental hazards, damage and abrasion, a sealing filler material 40 may be inserted or injected into the passageway about the balancer member. Preferably, the filler material is seen in FIG. 1A is a silicon or epoxy. A two-part epoxy is preferred as it will assist in adhesively securing the balancer to the rim in addition to the mechanical retention which occurs by virtue of its position in the passageway.

Turning now to FIGS. 2 and 2A, another embodiment of the invention is shown in connection with the wheel 110 having a rim with a bottom 118 and oppositely disposed edges 120. The rim is again formed to receive a tire and the rim may be of the type used on a motorcycle or automobile. The U-shaped recess 122 is provided at an intermediate location along the bottom wall 118. One side wall 130 of recess 122 is formed, as by machining, having an annular groove 126 which receives the balancer tube assembly 50 which has been fabricated and installed as described with respect to FIG. 5. Recess 122 has a bottom wall 128 and side walls 130 and is filled or partially filled with a sealant such as a silicon or an epoxy to protect at least the side of the tubing that is exposed.

FIGS. 3 and 3A show another embodiment of the invention designated by the numeral 200. In this embodiment, the rim 210 is a wheel rim for a motorcycle or a vehicle, again having a bottom surface 218 and opposite upstanding rim portions 220. In an intermediate portion of the bottom surface 218 is recessed at 228 and an annular groove 226 is machined into the side wall of the recess beneath flange 230. Balancer tube or ring 50 is inserted into the machined groove 226. The balancer ring is as has been described above with reference to FIG. 5 containing a suitable balancing fluid mass. The balancing ring is sealed in place by a suitable application of sealant 260.

In FIGS. 4 and 4A yet another embodiment is shown which is designated by the numeral 300. Embodiment 300 shows the balancer of the present invention applied to a wheel rim 310 of the type typically used on a truck or car. The rim 310 is a two-piece rim having sections 312 and 314 which each have a bolt circle 320 and 320A which abut and are secured together by bolts 325. The balancer ring 340 has an outer rim 342 which defines an annular channel 345 which opens to one face of the ring. The ring may be provided with radial spokes 348 which connect to a central hub 352. When the rim is assembled, the bolts 325 extend through the bolt holes 350 in the annular ring of the balancer to secure the balancer in abutment against the rim 320. The balancer ring is positioned within the passageway. The balancer ring is of the type previously described and shown with reference to FIG. 5 in which a tube 50 is joined at its ends and contains a circulating fluid mass. To further protect the balancer, sealant 380 may be placed around the balancer tube and also placed annularly around the area where the wheel rim bolt circles abut.

Figure 7:
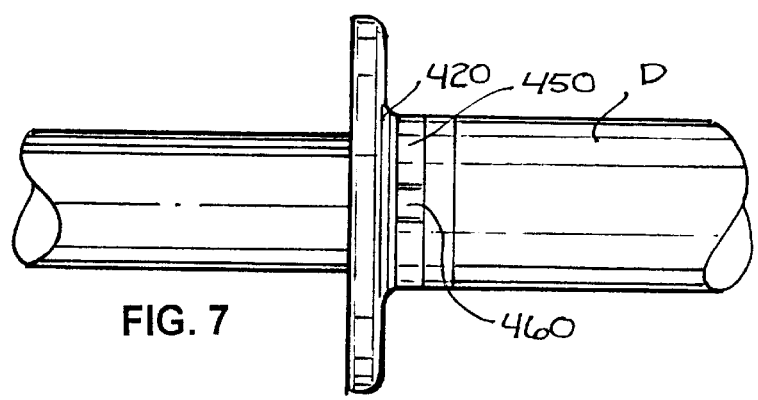
Figure 7A:
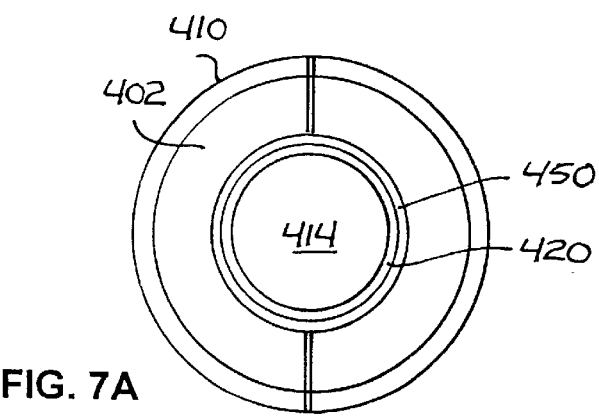

Referring to FIGS. 6, 7 and 7A, another embodiment of the balancer is shown which is generally designated by the numeral 400. The balancer 400 is to be applied to rotating members such as a drive shaft "D" as seen in FIG. 7. It is well known that slight mis-alignment in a drive shaft can impart severe vibration to a vehicle and, accordingly, application of the balancer to a member such as a drive shaft can provide dynamic balancing to offset this condition. The balancer 400 has a body 402 which is in the form of a circular plate which about its periphery is formed as by rolling at 410 to establish a channel 412. An opening 414 is provided in the plate 402 from which extends a flange which serves as a coupling 420 to be attached or secured about the drive shaft "D".

The balancing member 430 is disposed within the peripheral channel about the rolled rim of the body. The balancing member is as has been described above and comprises an annular flexible tube of suitable material such as rubber or neoprene. Contained within the hollow tube is a fluid balancing mass such as mercury, or small metallic balls, suspended in a viscous fluid such as silicon fluid or oil. The opposite ends of the tube are abutted as has been shown in FIG. 5 and joined by an adhesive. Preferably the joint is reinforced by the application of a shrink sleeve as has been described above.

The balancer 400 is split diametrally as shown in FIG. 7A so that the two halves can be placed about the drive shaft "D" with the interior of the coupling section 420 engaging the drive shaft. A suitable fastener such as a clamp 450 is placed about the coupling and tightened in place at tightener 460. In the event the drive shaft begins to vibrate or wobble due to imbalance, the rotating mass within the tubular raceway of the balancer will tend to dynamically oppose the imbalance and suppress vibration.

Referring to FIG. 8, the invention is applied to a flywheel such as flywheel 500 of the type utilized in an internal combustion engine such as a motorcycle engine. An imbalance of just a few grams can cause substantial vibration to an engine which is increased as engine speed increases.

Traditionally engines for motorcycles are balanced either using a static or dynamic system. However, both approaches have disadvantages. Static balancing, at most, roughly approximates counterbalancing. Dynamic balancing is done at a fixed speed and a flywheel that is smooth at, for example, 1500 rpm, may experience significant vibration at higher speeds.

Accordingly, flywheel 500 is initially machined placing a relatively shallow annular groove 502 cut into one surface. The flywheel is mounted on a lathe and components such as connecting rods are wrapped with a protective elastic band to prevent damage.

Once the groove is machined, the balancing ring 510 is secured in the groove. The ring is a flexible tube as described above containing a fluid balancing mass such as mercury or a fluid such as silicon or oil containing small metal beads or shot. The ring is secured to the flywheel using an adhesive such as epoxy 512.

It will be obvious to those skilled in the art to make various changes, alterations and modifications to the invention described herein. To the extent such changes, alterations and modifications do not depart from the spirit and scope of the appended claims, they are intended to be encompassed therein.

I claim:

1. A method of balancing a generally circular rotating member comprising:
   (a) providing an annular recess in said rotating member concentric about the axis of rotation;
   (b) providing a length of flexible tubing having passageway;
   (c) partially filling said passageway with a fluid mass that will shift therein to compensate for imbalance and vibration;
   (d) applying a sleeve over the abutting ends of said tubing and shrink fitting a sleeve onto the abutting ends to form a continuous ring having a generally circular passageway containing the fluid mass; and
   (e) placing said ring in said recess and applying a protective material over said ring in said recess.

2. The method of claim 1 wherein said member is a flywheel.

3. The method of claim 1 wherein said member is a vehicle wheel and said wheel is formed having a flange section defining said recess.

4. A balancing member for balancing a generally circular rotatable member having a recess therein concentric about the axis of rotation, said member comprising:

(a) a flexible tubing section having ends formed into a continuous ring defining an internal passageway and configured to seat in said recess the ends of said tubing abutting and secured by a shrink fitted sleeve and reinforced by a substantially rigid tubular member in said passageway at said abutting ends;
   (b) a fluid mass in said passageway shiftable in response to motion to counter imbalance and vibration; and
   (c) a protective material overlying said tube in said recess.

5. The balancing member of claim 4 wherein said fluid mass is mercury.

6. The balancing member of claim 4 wherein said fluid includes small metal beads.

7. The balancing member of claim 4 wherein said tubing section is formed from a section of tubing having opposite ends connected by a sleeve.

8. The balancing member of claim 4 wherein said rotatable member is a flywheel and said recess is a groove machined therein.

9. The balancing member of claim 4 wherein said rotatable member is a vehicle wheel formed of metal having a flange defining said recess and wherein said protective material is a sealant injected into said recess.

10. A balancing member for rotating a shaft comprising:
    (a) a coupling having a body engageable about said shaft;
    (b) a generally circular flange extending from said body defining an annular recess;
    (c) a flexible tubing section having opposite ends formed into a continuous ring defining an internal passageway seated in said annular recess the ends of said section abutting and joined by a shrink fitted sleeve;
    (d) a fluid mass in said passageway shiftable in response to motor to counter imbalance and vibration.

11. A balancing member for a vehicle wheel having a bolt circle, said member comprising:
    (a) a generally circular plate having a bolt circle matching the bolt circle of said wheel and having an annular channel adjacent the periphery thereof;
    (b) a flexible tubing section having opposite ends and formed into a continuous ring defining an internal passageway and seated in said channel the ends of said section abutting and joined by a shrink fitted sleeve; and
    (c) a fluid mass in said passageway shiftable in reasons to motion to counter imbalance and vibration.

* * * * *